United States Patent
Yang

(10) Patent No.: US 9,501,841 B2
(45) Date of Patent: Nov. 22, 2016

(54) METHOD FOR COLOR CALIBRATION AND USER TERMINAL

(71) Applicant: Huawei Device Co., LTD, Shenzhen (CN)

(72) Inventor: Hong Yang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 254 days.

(21) Appl. No.: 14/021,423

(22) Filed: Sep. 9, 2013

(65) Prior Publication Data

US 2014/0104297 A1    Apr. 17, 2014

(30) Foreign Application Priority Data

Sep. 24, 2012    (CN) .......................... 2012 1 0358023

(51) Int. Cl.
G09G 5/02 (2006.01)
G06T 11/00 (2006.01)
G09G 3/20 (2006.01)

(52) U.S. Cl.
CPC ........... *G06T 11/001* (2013.01); *G09G 3/2003* (2013.01); *G09G 5/02* (2013.01); *G09G 2320/0666* (2013.01); *G09G 2320/0693* (2013.01)

(58) Field of Classification Search
None
See application file for complete search history.

(56) References Cited

U.S. PATENT DOCUMENTS

| | | |
|---|---|---|
| 2007/0210177 A1 | 9/2007 | Karasek |
| 2010/0073340 A1* | 3/2010 | Morimoto ..................... 345/207 |
| 2012/0206747 A1 | 8/2012 | Park et al. |
| 2012/0268437 A1* | 10/2012 | Lee ............................. 345/207 |

FOREIGN PATENT DOCUMENTS

| | | |
|---|---|---|
| CN | 1353548 A | 6/2002 |
| CN | 101076128 A | 11/2007 |
| CN | 101184144 A | 5/2008 |
| JP | 07056545 | 3/1995 |
| JP | 2004101747 | 4/2004 |
| JP | 2004309373 | 11/2004 |
| JP | 2007241120 | 9/2007 |
| JP | 2009134142 | 6/2009 |
| JP | 2010256899 | 11/2010 |

OTHER PUBLICATIONS

Search Report and Written Opinion received in Application No. PCT/CN2013/078575 mailed Oct. 17, 2013, 11 pages.

* cited by examiner

*Primary Examiner* — Ryan D McCulley
(74) *Attorney, Agent, or Firm* — Slater Matsil, LLP

(57) ABSTRACT

Embodiments of the present invention provide a method for color calibration and a user terminal, which relate to the field of terminal display and are capable of compensating the colors of the displayed content on a screen according to the external light intensity, preventing content color distortion, and improving user experience. The embodiments of the present invention are used by a mobile terminal to calibrate screen colors according to external light.

15 Claims, 6 Drawing Sheets

US 9,501,841 B2

METHOD FOR COLOR CALIBRATION AND USER TERMINAL

CROSS-REFERENCE TO RELATED APPLICATION

This application claims priority to Chinese Patent Application No. 201210358023.0, filed on Sep. 24, 2012, which is hereby incorporated by reference in its entirety.

TECHNICAL FIELD

The present invention relates to the field of terminal display, and in particular, to a method for color calibration and a user terminal.

BACKGROUND

At present, big screens have become a trend for the development of a user terminal. However, the display effect of a screen of a user terminal varies greatly in different lighting conditions. In sunlight, especially, the strong light makes it quite difficult for a user to clearly see the content displayed on the screen of the user terminal, leading to poor user experience.

Although in the prior art, the user terminal can automatically adjust its screen luminance according to the external light intensity, when the external light is intense, over-adjustment of the luminance may cause color distortion of the displayed content on the screen of the user terminal, leading to worse user experience.

SUMMARY

Embodiments of the present invention provide a method for color calibration and a user terminal, capable of compensating colors of displayed content on a screen according to the external light intensity, thereby preventing color distortion of the content and improving user experience.

To achieve the preceding objectives, the embodiments of the present invention adopt the following technical solutions.

In a first aspect, a method for color calibration is provided, including:

obtaining, according to channel readings of a red channel, a green channel, and a blue channel and screen reflectivity, emission energies of the red channel, the green channel, and the blue channel;

obtaining, according to screen luminance and a red grayscale value, a green grayscale value, and a blue grayscale value of each picture element on a screen, current self-luminous energies of the red, green, and blue of each picture element on the screen;

obtaining, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element; and obtaining, according to the self-luminous energies upon compensation of the two colors with the lowest grayscale values, grayscale values upon compensation of the two colors with the lowest grayscale values.

In a first possible implementation manner, with reference to the first aspect, the obtaining, according to channel readings of a red channel, a green channel, and a blue channel and screen reflectivity, emission energies of the red channel, the green channel, and the blue channel includes:

obtaining the channel reading of the red channel, the channel reading of the green channel, and the channel reading of the blue channel and obtaining the screen reflectivity;

obtaining the emission energy of the red channel by multiplying the channel reading of the red channel and the screen reflectivity; and obtaining the emission energy of the green channel by multiplying the channel reading of the green channel and the screen reflectivity; and obtaining the emission energy of the blue channel by multiplying the channel reading of the blue channel and the screen reflectivity.

In a second possible implementation manner, with reference to the first aspect or the first possible implementation manner of the first aspect, the obtaining, according to screen luminance and a red grayscale value, a green grayscale value, and a blue grayscale value of each picture element on a screen, current self-luminous energies of the red, green, and blue of each picture element on the screen includes:

obtaining the screen luminance and obtaining the red grayscale value, the green grayscale value, and the blue grayscale value of each picture element on the screen;

obtaining, according to a mapping of the screen luminance, the color grayscale value, and the color self-luminous energy, the current self-luminous energy of red in correspondence with the red grayscale value;

obtaining, according to the mapping of the screen luminance, the color grayscale value, and the color self-luminous energy, the current self-luminous energy of green in correspondence with the green grayscale value; and obtaining, according to the mapping of the screen luminance, the color grayscale value, and the color self-luminous energy, the current self-luminous energy of blue in correspondence with the blue grayscale value, where the mapping of the screen luminance, the color grayscale value, and the color self-luminous energy is preset in a user terminal.

In a third possible implementation manner, with reference to the first aspect, or the first possible implementation manner of the first aspect, or the second possible implementation manner of the first aspect, the obtaining, according to the emission energies of the red channel, the green channel, and the blue channel and the self-luminous energies of the red, green, and blue of each picture element, self-luminous energies upon compensation of the two colors with the lowest grayscale values among the red, green, and blue of each picture element includes:

comparing the red grayscale value, the green grayscale value, and the blue grayscale value of each picture element on the screen;

if the red grayscale value is the largest, obtaining, according to a first self-luminous energy formula, the green self-luminous energy upon compensation and obtaining, according to a second self-luminous energy formula, the blue self-luminous energy upon compensation, where the first self-luminous energy formula includes:

$$G'_s = G_s * \frac{R_s + R_r}{R_s} - G_r,$$

where $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula includes:

$$B'_s = B_s * \frac{R_s + R_r}{R_s} - B_r,$$

where $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel;

if the green grayscale value is the largest, obtaining, according to a third self-luminous energy formula, the red self-luminous energy upon compensation and obtaining, according to a fourth self-luminous energy formula, the blue self-luminous energy upon compensation, where the third self-luminous energy formula includes:

$$R'_s = R_s * \frac{G_s + G_r}{G_s} - R_r,$$

where $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula includes:

$$B'_s = B_s * \frac{G_s + G_r}{G_s} - B_r,$$

where $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel; and if the blue grayscale value is the largest, obtaining, according to a fifth self-luminous energy formula, the red self-luminous energy upon compensation and obtaining, according to a sixth self-luminous energy formula, the green self-luminous energy upon compensation, where the fifth self-luminous energy formula includes:

$$R'_s = R_s * \frac{B_s + B_r}{B_s} - R_r,$$

where $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula includes:

$$G'_s = G_s * \frac{B_s + B_r}{B_s} - G_r,$$

where $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

In a fourth possible implementation manner, with reference to the first aspect, or the first possible implementation manner of the first aspect, or the second possible implementation manner of the first aspect, the obtaining, according to the self-luminous energies upon compensation of the two colors with the lowest grayscale values, grayscale values upon compensation of the two colors with the lowest grayscale values includes:

obtaining, according to the green self-luminous energy upon compensation and by using a green grayscale formula, the green grayscale value upon compensation and obtaining, according to the blue self-luminous energy upon compensation and by using a blue grayscale formula, the blue grayscale value upon compensation, if the red grayscale value is the largest;

obtaining, according to the red self-luminous energy upon compensation and by using a red grayscale formula, the red grayscale value upon compensation and obtaining, according to the blue self-luminous energy upon compensation and by using the blue grayscale formula, the blue grayscale value upon compensation, if the green grayscale value is the largest; and obtaining, according to the red self-luminous energy upon compensation and by using the red grayscale formula, the red grayscale value upon compensation and obtaining, according to the green self-luminous energy upon compensation and by using the green grayscale formula, the green grayscale value upon compensation, if the blue grayscale value is the largest, where the red grayscale formula includes:

$$R' = \sqrt[2.2]{\frac{Rs' * \left(\frac{R}{255}\right)^{2.2}}{Rs}} * 255,$$

where $R_s'$ indicates the red self-luminous energy upon compensation, $R_s$ indicates the red grayscale value, and $R'$ indicates the red grayscale value upon compensation;

the green grayscale formula includes:

$$G' = \sqrt[2.2]{\frac{Gs' * \left(\frac{G}{255}\right)^{2.2}}{Gs}} * 255,$$

where $G_s'$ indicates the green self-luminous energy upon compensation, $G_s$ indicates the green grayscale value, and $G'$ indicates the green grayscale value upon compensation; and the blue grayscale formula includes:

$$B' = \sqrt[2.2]{\frac{Bs' * \left(\frac{B}{255}\right)^{2.2}}{Bs}} * 255,$$

where $B_s'$ indicates the blue self-luminous energy upon compensation, $B_s$ indicates the blue grayscale value, and B' indicates the blue grayscale value upon compensation.

In the second aspect, a user terminal is provided, including:

a display parameter obtaining unit, configured to obtain, according to channel readings of a red channel, a green channel, and a blue channel and screen reflectivity, emission energies of the red channel, the green channel, and the blue channel and transmit the emission energies of the red channel, the green channel, and the blue channel to a luminous energy compensation unit;

a luminous energy obtaining unit, configured to obtain, according to the screen luminance and a red grayscale value, a green grayscale value, and a blue grayscale value of each picture element on a screen, current self-luminous energies of the red, green, and blue of each picture element on the screen and transmit the current self-luminous energies of the red, green, and blue of each picture element to the luminous energy compensation unit;

the luminous energy compensation unit, configured to receive, from the display parameter obtaining unit, the emission energies of the red channel, the green channel, and the blue channel, receive, from the luminous energy obtaining unit, the current self-luminous energies of the red, green, and blue of each picture element, and transmit them to the luminous energy obtaining unit, obtain, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element, and transmit the self-luminous energies upon compensation of the two colors with the lowest grayscale values to a grayscale value compensation unit; and the grayscale value compensation unit, configured to receive, from the luminous energy compensation unit, the self-luminous energies upon compensation of the two colors with the lowest grayscale values and obtain, according to the self-luminous energies upon compensation of the two colors with the lowest grayscale values, grayscale values upon compensation of the two colors with the lowest grayscale values.

In a first possible implementation manner, with reference to the second aspect, the display parameter obtaining unit includes:

a channel reading obtaining subunit, configured to obtain the channel reading of the red channel, the channel reading of the green channel, and the channel reading of the blue channel and transmit the channel reading of the red channel, the channel reading of the green channel, and the channel reading of the blue channel to an emission energy obtaining subunit;

a reflectivity obtaining subunit, configured to obtain the screen reflectivity and transmit the screen reflectivity to the emission energy obtaining subunit; and the emission energy obtaining subunit, configured to obtain, from the channel reading obtaining subunit, the channel reading of the red channel, the channel reading of the green channel, and the channel reading of the blue channel, receive, from the reflectivity obtaining subunit, the screen reflectivity, and obtain the emission energy of the red channel by multiplying the channel reading of the red channel and the screen reflectivity;

where the emission energy obtaining subunit is further configured to obtain the emission energy of the green channel by multiplying the channel reading of the green channel and the screen reflectivity; and the emission energy obtaining subunit is further configured to obtain the emission energy of the blue channel by multiplying the channel reading of the blue channel and the screen reflectivity.

In a second possible implementation manner, with reference to the first possible implementation manner of the second aspect, the luminous energy obtaining unit includes:

a grayscale value obtaining subunit, configured to obtain the screen luminance, obtain the red grayscale value, the green grayscale value, and the blue grayscale value of each picture element on the screen and transmit the red grayscale value, the green grayscale value, and the blue grayscale value of each picture element to a self-luminous energy obtaining subunit; and the self-luminous energy obtaining subunit, configured to receive, from the grayscale value obtaining subunit, the red grayscale value, the green grayscale value, and the blue grayscale value of each picture element, and obtain, according to a mapping of the screen luminance, the color grayscale value, and the color self-luminous energy, the current self-luminous energy of red in correspondence with the red grayscale value;

where the self-luminous energy obtaining subunit is further configured to obtain, according to the mapping of the screen luminance, the color grayscale value, and the color self-luminous energy, the current self-luminous energy of green in correspondence with the green grayscale value; and the self-luminous energy obtaining subunit is further configured to obtain, according to the mapping of the screen luminance, the color grayscale value, and the color self-luminous energy, the current self-luminous energy of blue in correspondence with the blue grayscale value, where the mapping of the screen luminance, the color grayscale value, and the color self-luminous energy is preset in the user terminal.

In a third possible implementation manner, with reference to the second aspect, or the first possible implementation manner of the second aspect, or the second possible implementation manner of the second aspect, the luminous energy compensation unit is specifically configured to:

compare the red grayscale value, the green grayscale value, and the blue grayscale value of each picture element on the screen;

if the red grayscale value is the largest, obtain, according to a first self-luminous energy formula, the green self-luminous energy upon compensation and obtain, according to a second self-luminous energy formula, the blue self-luminous energy upon compensation, where the first self-luminous energy formula includes:

$$G_s' = G_s * \frac{R_s + R_r}{R_s} - G_r,$$

where $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula includes:

$$B_s' = B_s * \frac{R_s + R_r}{R_s} - B_r,$$

where $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel;

if the green grayscale value is the largest, obtain, according to a third self-luminous energy formula, the red self-luminous energy upon compensation and obtain, according to a fourth self-luminous energy formula, the blue self-luminous energy upon compensation, where the third self-luminous energy formula includes:

$$R_s' = R_s * \frac{G_s + G_r}{G_s} - R_r,$$

where $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula includes:

$$B_s' = B_s * \frac{G_s + G_r}{G_s} - B_r,$$

where $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel; and if the blue grayscale value is the largest, obtain, according to a fifth self-luminous energy formula, the red self-luminous energy upon compensation and obtain, according to a sixth self-luminous energy formula, the green self-luminous energy upon compensation, where the fifth self-luminous energy formula includes:

$$R_s' = R_s * \frac{B_s + B_r}{B_s} - R_r,$$

where $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula includes:

$$G_s' = G_s * \frac{B_s + B_r}{B_s} - G_r,$$

where $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

In a fourth possible implementation manner, with reference to the second aspect, or the first possible implementation manner of the second aspect, or the second possible implementation manner of the second aspect, the grayscale value compensation unit is specifically configured to:

obtain, according to the green self-luminous energy upon compensation and by using a green grayscale formula, the green grayscale value upon compensation and obtain, according to the blue self-luminous energy upon compensation and by using a blue grayscale formula, the blue grayscale value upon compensation, if the red grayscale value is the largest;

obtain, according to the red self-luminous energy upon compensation and by using a red grayscale formula, the red grayscale value upon compensation and obtain, according to the blue self-luminous energy upon compensation and by using the blue grayscale formula, the blue grayscale value upon compensation, if the green grayscale value is the largest; and obtain, according to the red self-luminous energy upon compensation and by using the red grayscale formula, the red grayscale value upon compensation and obtain, according to the green self-luminous energy upon compensation and by using the green grayscale formula, the green grayscale value upon compensation, if the blue grayscale value is the largest, where the red grayscale formula includes:

$$R' = \sqrt[2.2]{\frac{Rs' * \left(\frac{R}{255}\right)^{2.2}}{Rs}} * 255,$$

where $R_s'$ indicates the red self-luminous energy upon compensation, $R_s$ indicates the red grayscale value, and R' indicates the red grayscale value upon compensation;

the green grayscale formula includes:

$$G' = \sqrt[2.2]{\frac{Gs' * \left(\frac{G}{255}\right)^{2.2}}{Gs}} * 255,$$

where $G_s'$ indicates the green self-luminous energy upon compensation, $G_s$ indicates the green grayscale value, and G' indicates the green grayscale value upon compensation; and the blue grayscale formula includes:

$$B' = \sqrt[2.2]{\frac{Bs' * \left(\frac{B}{255}\right)^{2.2}}{Bs}} * 255,$$

where $B_s'$ indicates the blue self-luminous energy upon compensation, $B_s$ indicates the blue grayscale value, and B' indicates the blue grayscale value upon compensation.

The embodiments of the present invention provide a method for color calibration and a user terminal, where channel emission energies of the red, green, and blue and screen reflectivity are obtained, and current self-luminous energies of the red, green, and blue of each picture element on a screen are obtained, and then grayscale values upon compensation of the two colors with the lowest grayscale values of each picture element are obtained according to the channel emission energies of the red, green, and blue and the current self-luminous energies of the red, green, and blue of each picture element, so that the colors of the displayed content on the screen can be compensated according to the external light intensity, thereby preventing content color distortion and improving user experience.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art according to the embodiment of the present invention without creative efforts shall fall within the protection scope of the present invention.

Figure 1:
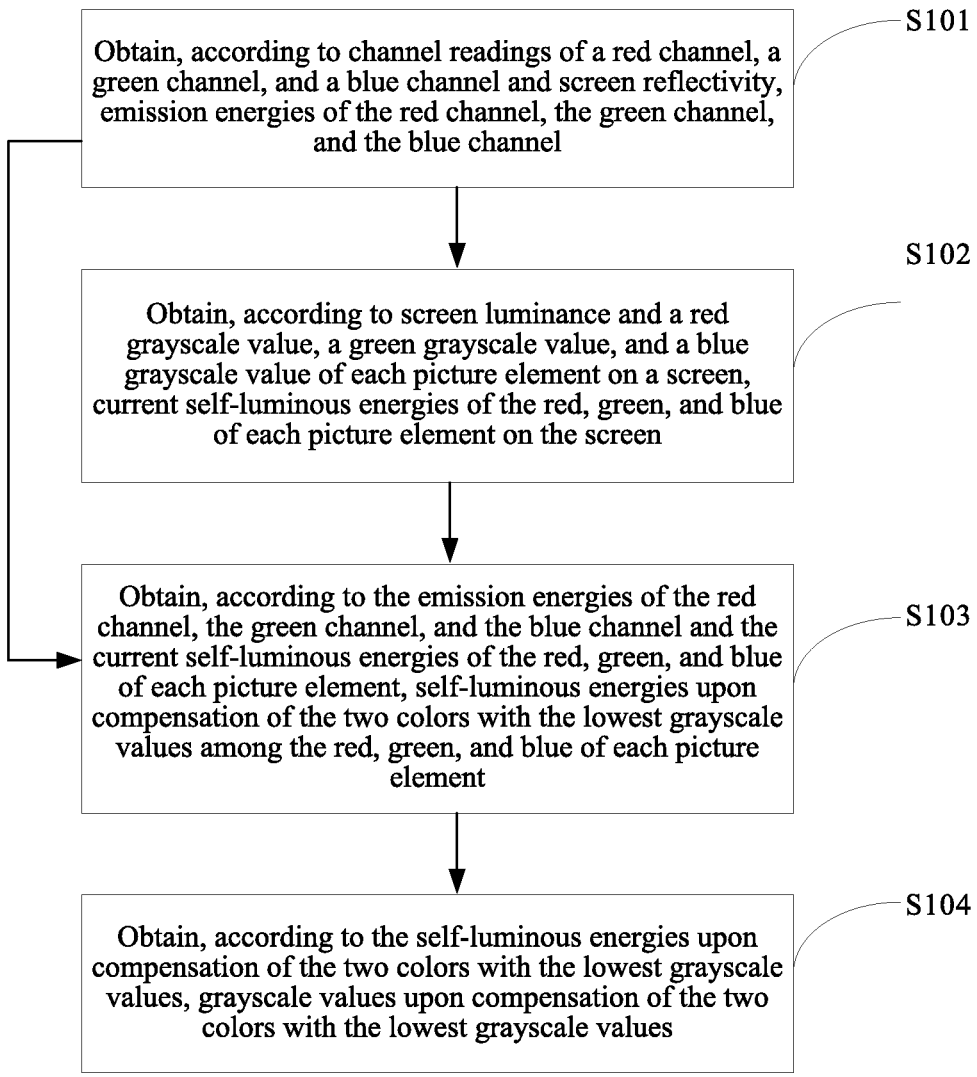
FIG. 1 is a schematic flowchart of a method for color calibration according to an embodiment of the present invention.

An embodiment of the present invention provides a method for color calibration. This method is executed by a user terminal. As shown in FIG. 1, the method includes:

S101. Obtain, according to channel readings of a red channel, a green channel, and a blue channel and screen reflectivity, emission energies of the red channel, the green channel, and the blue channel.

S102. Obtain, according to screen luminance and a red grayscale value, a green grayscale value, and a blue grayscale value of each picture element on a screen, current self-luminous energies of the red, green, and blue of each picture element on the screen.

S103. Obtain, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element.

S104. Obtain, according to the self-luminous energies upon compensation of the two colors with the lowest grayscale values, grayscale values upon compensation of the two colors with the lowest grayscale values.

An embodiment of the present invention provides a method for color calibration, where channel emission energies of the red, green, and blue and screen reflectivity are obtained, and current self-luminous energies of the red, green, and blue of each picture element on a screen are obtained, and then grayscale values upon compensation of the two colors with the lowest grayscale values of each picture element are obtained according to the channel emission energies of the red, green, and blue and the current self-luminous energies of the red, green, and blue of each picture element, so that the colors of the displayed content on the screen can be compensated according to the external light intensity, thereby preventing content color distortion, and improving user experience.

Figure 2:
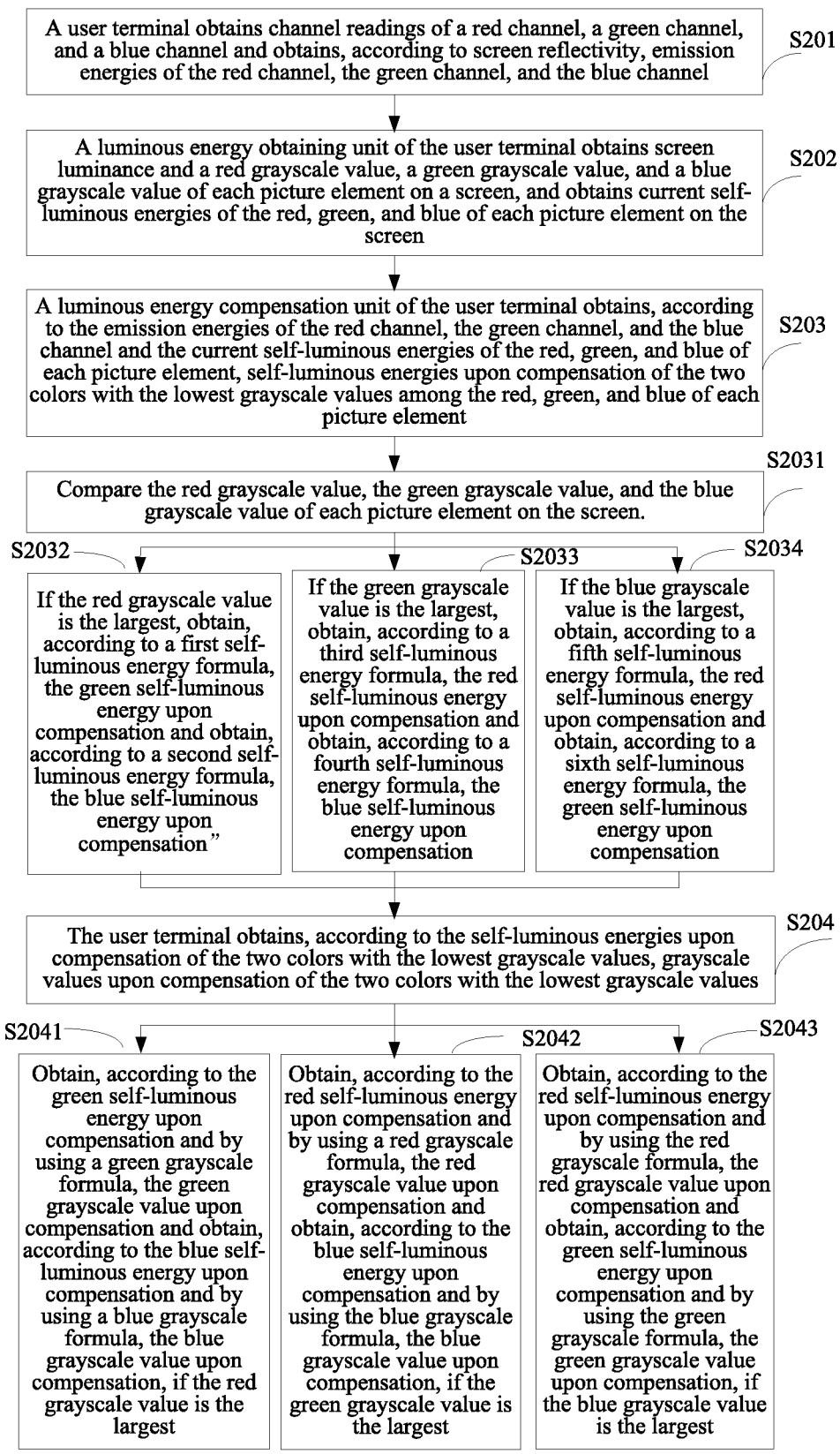
FIG. 2 is a schematic flowchart of a method for color calibration according to another embodiment of the present invention.

Another embodiment of the present invention provides a method for color calibration. This method is executed by a user terminal. As shown in FIG. 2, the method includes:

S201. Obtain channel readings of a red channel, a green channel, and a blue channel and obtain, according to screen reflectivity, emission energies of the red channel, the green channel, and the blue channel.

The specific implementation manner may include:

first, obtaining, by using an RGB (Red Green Blue, red green blue) sensor in the user terminal, the channel reading of the red channel, the channel reading of the green channel, and the channel reading of the blue channel, and obtaining the screen reflectivity;

similarly, obtaining the emission energy of the red channel by multiplying the channel reading of the red channel and the screen reflectivity;

obtaining the emission energy of the green channel by multiplying the channel reading of the green channel and the screen reflectivity; and obtaining the emission energy of the blue channel by multiplying the channel reading of the blue channel and the screen reflectivity.

S202. A luminous energy obtaining unit obtains screen luminance and a red grayscale value, a green grayscale value, and a blue grayscale value of each picture element on a screen, and obtains current self-luminous energies of the red, green, and blue of each picture element on the screen.

The specific implementation manner may include:

first, obtaining the screen luminance and obtaining the red grayscale value, the green grayscale value, and the blue grayscale value of each picture element on the screen;

then, obtaining, according to a mapping of the screen luminance, the color grayscale value, and the color self-luminous energy, the self-luminous energy of red in correspondence with the red grayscale value;

similarly, obtaining, according to the mapping of the screen luminance, the color grayscale value, and the color self-luminous energy, the self-luminous energy of green in correspondence with the green grayscale value; and obtaining, according to the mapping of the screen luminance, the color grayscale value, and the color self-luminous energy, the self-luminous energy of blue in correspondence with the blue grayscale value, where the mapping of the screen luminance, the color grayscale value, and the color self-luminous energy is preset in the user terminal.

S203. A luminous energy compensation unit obtains, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element.

The specific step may include:

S2031. Compare the red grayscale value, the green grayscale value, and the blue grayscale value of each picture element on the screen.

S2032. If the red grayscale value is the largest, obtain, according to a first self-luminous energy formula, the green self-luminous energy upon compensation and obtain, according to a second self-luminous energy formula, the blue self-luminous energy upon compensation, where the first self-luminous energy formula includes:

$$G'_s = G_s * \frac{R_s + R_r}{R_s} - G_r,$$

where $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula includes:

$$B'_s = B_s * \frac{R_s + R_r}{R_s} - B_r,$$

where $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

S2033. If the green grayscale value is the largest, obtain, according to a third self-luminous energy formula, the red self-luminous energy upon compensation and obtain, according to a fourth self-luminous energy formula, the blue self-luminous energy upon compensation, where the third self-luminous energy formula includes:

$$R'_s = R_s * \frac{G_s + G_r}{G_s} - R_r,$$

where $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula includes:

$$B'_s = B_s * \frac{G_s + G_r}{G_s} - B_r,$$

where $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

S2034. If the blue grayscale value is the largest, obtain, according to a fifth self-luminous energy formula, the red self-luminous energy upon compensation and obtain, according to a sixth self-luminous energy formula, the green self-luminous energy upon compensation, where the fifth self-luminous energy formula includes:

$$R'_s = R_s * \frac{B_s + B_r}{B_s} - R_r,$$

where $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula includes:

$$G'_s = G_s * \frac{B_s + B_r}{B_s} - G_r,$$

where $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

S204. Obtain, according to the self-luminous energies upon compensation of the two colors with the lowest grayscale values, grayscale values upon compensation of the two colors with the lowest grayscale values.

The specific step may include:

S2041. Obtain, according to the green self-luminous energy upon compensation and by using a green grayscale formula, the green grayscale value upon compensation and obtain, according to the blue self-luminous energy upon compensation and by using a blue grayscale formula, the blue grayscale value upon compensation, if the red grayscale value is the largest.

S2042. Obtain, according to the red self-luminous energy upon compensation and by using a red grayscale formula, the red grayscale value upon compensation and obtain, according to the blue self-luminous energy upon compensation and by using the blue grayscale formula, the blue grayscale value upon compensation, if the green grayscale value is the largest.

S2043. Obtain, according to the red self-luminous energy upon compensation and by using the red grayscale formula, the red grayscale value upon compensation and obtain, according to the green self-luminous energy upon compensation and by using the green grayscale formula, the green grayscale value upon compensation, if the blue grayscale value is the largest, where the red grayscale formula includes:

$$R' = \sqrt[2.2]{\frac{R'_s * \left(\frac{R}{255}\right)^{2.2}}{R_s}} * 255,$$

where $R_s'$ indicates the red self-luminous energy upon compensation, $R_s$ indicates the red grayscale value, and $R'$ indicates the red grayscale value upon compensation;

the green grayscale formula includes:

$$G' = \sqrt[2.2]{\frac{G'_s * \left(\frac{G}{255}\right)^{2.2}}{G_s}} *255,$$

where $G_s'$ indicates the green self-luminous energy upon compensation, $G_s$ indicates the green grayscale value, and $G'$ indicates the green grayscale value upon compensation; and the blue grayscale formula includes:

$$B' = \sqrt[2.2]{\frac{B'_s * \left(\frac{B}{255}\right)^{2.2}}{B_s}} *255,$$

where $B_s'$ indicates the blue self-luminous energy upon compensation, $B_s$ indicates the blue grayscale value, and $B'$ indicates the blue grayscale value upon compensation.

At last, after obtaining the grayscale values of the red, green, and blue upon compensation, the user terminal transmits the grayscale values upon compensation to a screen display controller so that the screen controller displays the corresponding colors according to the grayscale values upon compensation. In this way, the colors of the displayed content on the screen are compensated according to the external light intensity.

An embodiment of the present invention provides a method for color calibration, where channel emission energies of the red, green, and blue and the screen reflectivity are obtained, and current self-luminous energies of the red, green, and blue of each picture element on a screen are obtained, and then grayscale values upon compensation of the two colors with the lowest grayscale values of each picture element are obtained according to the channel emission energies of the red, green, and blue and the current self-luminous energies of the red, green, and blue of each picture element, so that the colors of the displayed content on the screen can be compensated according to the external light intensity, thereby preventing content color distortion and improving user experience.

Figure 3:
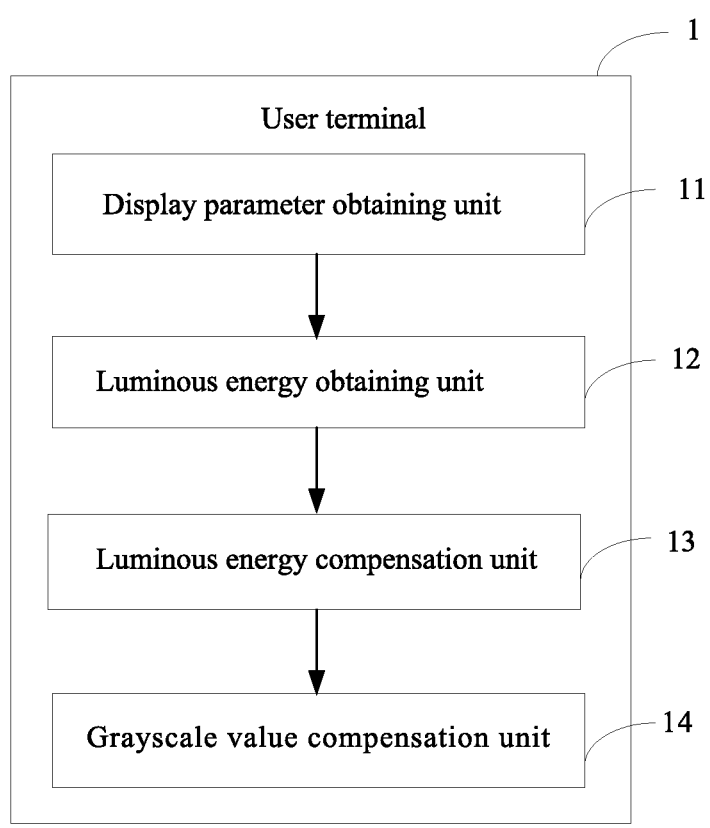
FIG. 3 is a schematic structural diagram of a user terminal according to yet another embodiment of the present invention.

Another embodiment of the present invention provides a user terminal 1, as shown in FIG. 3, including:

a display parameter obtaining unit 11, configured to obtain, according to channel readings of a red channel, a green channel, and a blue channel and screen reflectivity, emission energies of the red channel, the green channel, and the blue channel and transmit the emission energies of the red channel, the green channel, and the blue channel to a luminous energy compensation unit 13;

a luminous energy obtaining unit 12, configured to obtain, according to the screen luminance and a red grayscale value, a green grayscale value, and a blue grayscale value of each picture element on a screen, current self-luminous energies of the red, green, and blue of each picture element on the screen, and transmit the current self-luminous energies of the red, green, and blue of each picture element to the luminous energy compensation unit 13;

the luminous energy compensation unit 13, configured to receive, from the display parameter obtaining unit 11, the emission energies of the red channel, the green channel, and the blue channel, receive, from the luminous energy obtaining unit 12, the current self-luminous energies of the red, green, and blue of each picture element and transmit them to the luminous energy, and obtain, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element; and a grayscale value compensation unit 14, configured to receive, from the luminous energy compensation unit 13, the self-luminous energies upon compensation of the two colors with the lowest grayscale values and obtain, according to the self-luminous energies upon compensation of the two colors with the lowest grayscale values, grayscale values upon compensation of the two colors with the lowest grayscale values.

Figure 4:
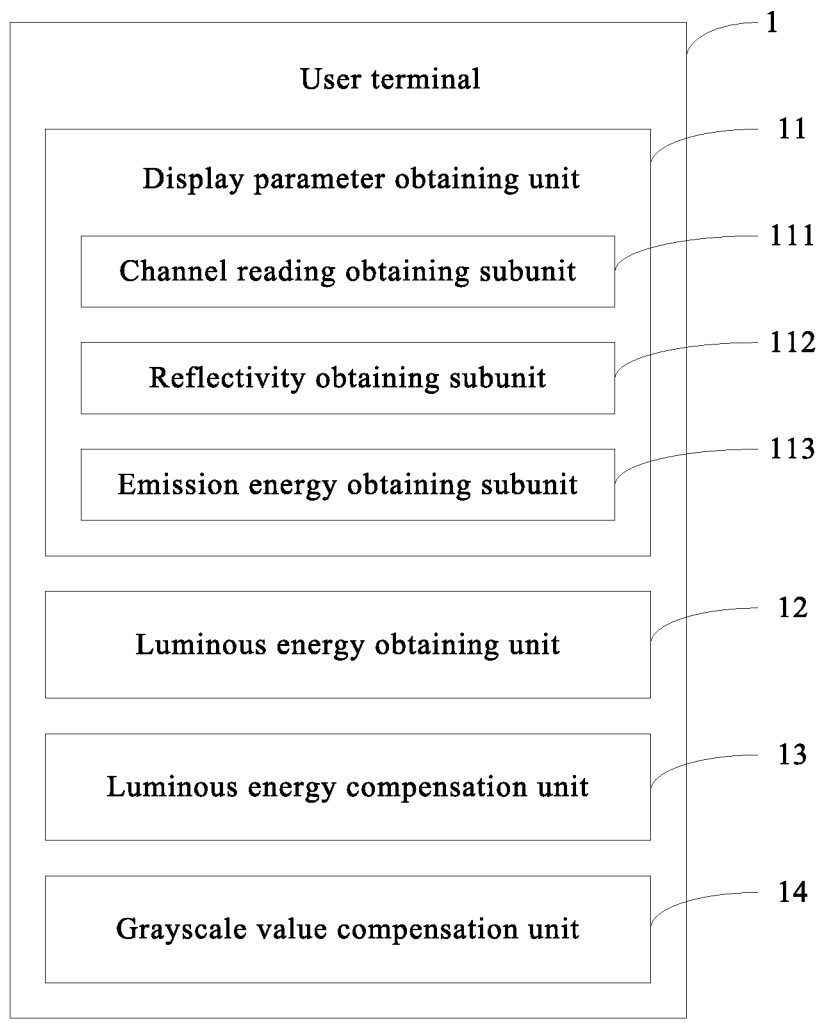
FIG. 4 is a schematic structural diagram of a user terminal according to yet another embodiment of the present invention.

Further, as shown in FIG. 4, the display parameter obtaining unit 11 may include:

a channel reading obtaining subunit 111, configured to obtain the channel reading of the red channel, the channel reading of the green channel, and the channel reading of the blue channel and transmit the channel reading of the red channel, the channel reading of the green channel, and the channel reading of the blue channel to an emission energy obtaining subunit 113;

a reflectivity obtaining subunit 112, configured to obtain the screen reflectivity and transmit the screen reflectivity to the emission energy obtaining subunit 113; and the emission energy obtaining subunit 113, configured to receive, from the channel reading obtaining subunit 111, the channel reading of the red channel, receive, from the reflectivity obtaining subunit 112, the screen reflectivity, and obtain the emission energy of the red channel by multiplying the channel reading of the red channel and the screen reflectivity;

where the emission energy obtaining subunit 113 is further configured to receive, from the channel reading obtaining subunit 111, the channel reading of the green channel, receive, from the reflectivity obtaining subunit 112, the screen reflectivity, and obtain the emission energy of the green channel by multiplying the channel reading of the green channel and the screen reflectivity; and the emission energy obtaining subunit 113 is further configured to receive, from the channel reading obtaining subunit 111, the channel reading of the blue channel, to receive, from the reflectivity obtaining subunit 112, the screen reflectivity, and obtain the emission energy of the blue channel by multiplying the channel reading of the blue channel and the screen reflectivity.

Figure 5:
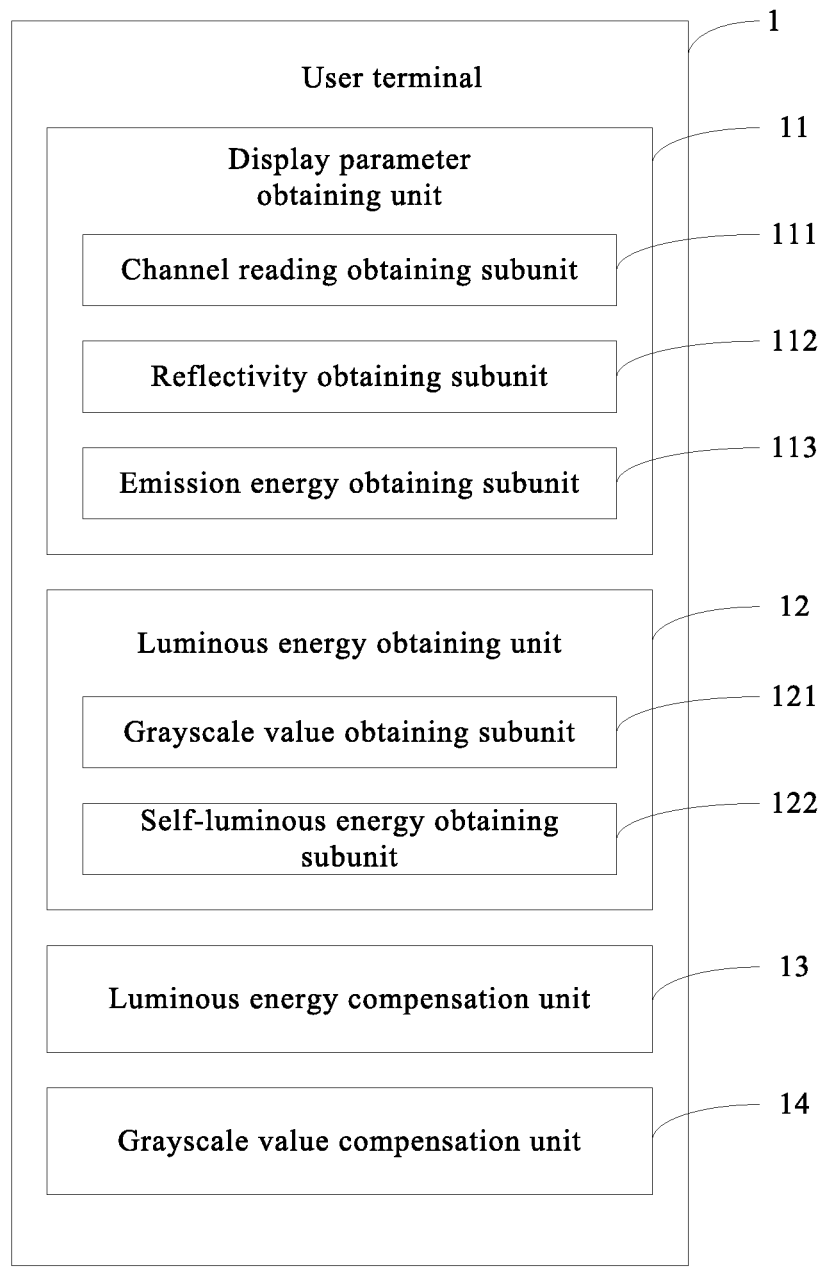
FIG. 5 is a schematic structural diagram of a user terminal according to yet another embodiment of the present invention.

Further, as shown in FIG. 5, the luminous energy obtaining unit 12 may include:

a grayscale value obtaining subunit 121, configured to obtain the screen luminance, obtain the red grayscale value, the green grayscale value, and the blue grayscale value of each picture element on the screen and transmit the red grayscale value, the green grayscale value, and the blue grayscale value of each picture element to a self-luminous energy obtaining subunit 122; and the self-luminous energy obtaining subunit 122, configured to receive, from the grayscale value obtaining subunit 121, the red grayscale value of each picture element, and obtain, according to a mapping of the screen luminance, the color grayscale value, and the color self-luminous energy, the current self-luminous energy of red in correspondence with the red grayscale value;

where the self-luminous energy obtaining subunit 122 is further configured to receive, from the grayscale value obtaining subunit 121, the green grayscale value of each picture element, and obtain, according to the mapping of the screen luminance, the color grayscale value, and the color self-luminous energy, the current self-luminous energy of green in correspondence with the green grayscale value; and the self-luminous energy obtaining subunit 122 is further configured to receive, from the grayscale value obtaining subunit 121, the blue grayscale value of each picture element, and obtain, according to the mapping of the screen luminance, the color grayscale value, and the color self-luminous energy, the current self-luminous energy of blue in correspondence with the blue grayscale value, where the mapping of the screen luminance, the color grayscale value, and the color self-luminous energy is preset in the user terminal.

Figure 6:
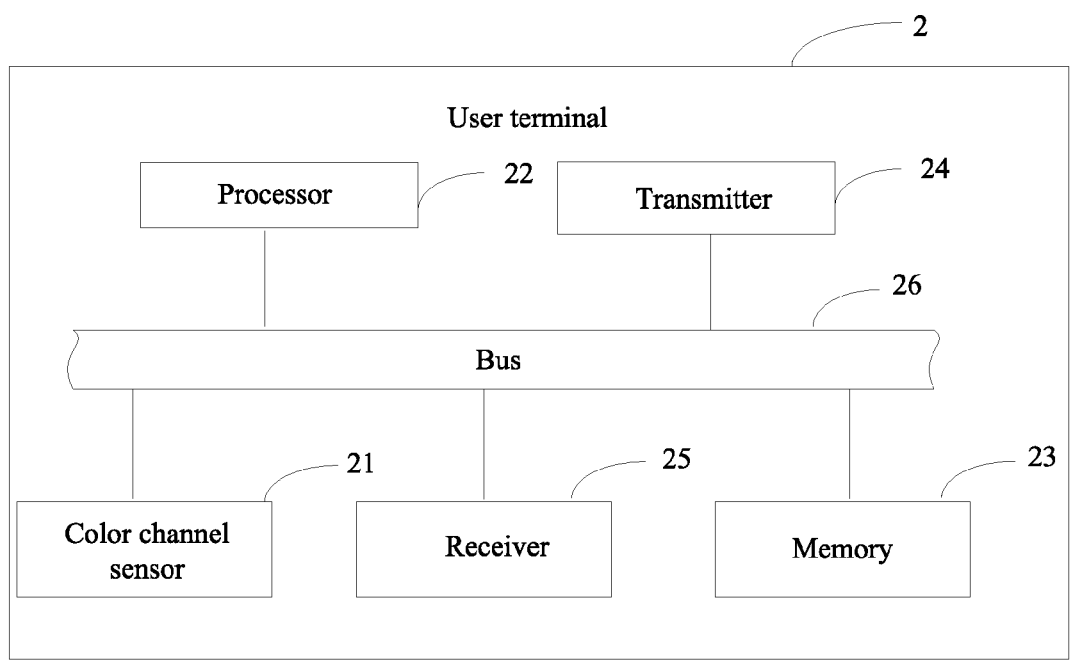
FIG. 6 is a schematic structural diagram of a user terminal according to still another embodiment of the present invention.

Further, as shown in FIG. 6, the luminous energy compensation unit 13 may further be specifically configured to:

compare the red grayscale value, the green grayscale value, and the blue grayscale value of each picture element on the screen;

if the red grayscale value is the largest, obtain, according to a first self-luminous energy formula, the green self-luminous energy upon compensation and obtain, according to a second self-luminous energy formula, the blue self-luminous energy upon compensation, where the first self-luminous energy formula includes:

$$G'_s = G_s * \frac{R_s + R_r}{R_s} - G_r,$$

where $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula includes:

$$B'_s = B_s * \frac{R_s + R_r}{R_s} - B_r,$$

where $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel;

if the green grayscale value is the largest, obtain, according to a third self-luminous energy formula, the red self-luminous energy upon compensation and obtain, according to a fourth self-luminous energy formula, the blue self-luminous energy upon compensation, where the third self-luminous energy formula includes:

$$R'_s = R_s * \frac{G_s + G_r}{G_s} - R_r,$$

where $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula includes:

$$B'_s = B_s * \frac{G_s + G_r}{G_s} - B_r,$$

where $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel; and if the blue grayscale value is the largest, obtain, according to a fifth self-luminous energy formula, the red self-luminous energy upon compensation and obtain, according to a sixth self-luminous energy formula, the green self-luminous energy upon compensation, where the fifth self-luminous energy formula includes:

$$R'_s = R_s * \frac{B_s + B_r}{B_s} - R_r,$$

where $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula includes:

$$G'_s = G_s * \frac{B_s + B_r}{B_s} - G_r,$$

where $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

Further, as shown in FIG. 7, the grayscale compensation unit may be specifically configured to:

obtain, according to the green self-luminous energy upon compensation and by using a green grayscale formula, the green grayscale value upon compensation and obtain, according to the blue self-luminous energy upon compensation and by using a blue grayscale formula, the blue grayscale value upon compensation, if the red grayscale value is the largest;

obtain, according to the red self-luminous energy upon compensation and by using a red grayscale formula, the red grayscale value upon compensation and obtain, according to the blue self-luminous energy upon compensation and by using the blue grayscale formula, the blue grayscale value upon compensation, if the green grayscale value is the largest; and obtain, according to the red self-luminous energy upon compensation and by using the red grayscale formula, the red grayscale value upon compensation and obtain, according to the green self-luminous energy upon compensation and by using the green grayscale formula, the green grayscale value upon compensation, if the blue grayscale value is the largest, where the red grayscale formula includes:

$$R' = \sqrt[2.2]{\frac{R'_s * \left(\frac{R}{255}\right)^{2.2}}{Rs}} * 255,$$

where $R_s'$ indicates the red self-luminous energy upon compensation, $R_s$ indicates the red grayscale value, and R' indicates the red grayscale value upon compensation;

the green grayscale formula includes:

$$G' = \sqrt[2.2]{\frac{G'_s * \left(\frac{G}{255}\right)^{2.2}}{Gs}} * 255,$$

where $G_s'$ indicates the green self-luminous energy upon compensation, $G_s$ indicates the green grayscale value, and G' indicates the green grayscale value upon compensation; and the blue grayscale formula includes:

$$B' = \sqrt[2.2]{\frac{B'_s * \left(\frac{B}{255}\right)^{2.2}}{Bs}} * 255,$$

where $B_s'$ indicates the blue self-luminous energy upon compensation, $B_s$ indicates the blue grayscale value, and B' indicates the blue grayscale value upon compensation.

After the grayscale values of the red, green, and blue upon compensation are obtained, the grayscale values upon compensation are transmitted to a screen display controller so that the screen controller displays the corresponding colors according to the grayscale values upon compensation.

An embodiment of the present invention provides a user terminal, where channel emission energies of the red, green, and blue and screen reflectivity are obtained, and current self-luminous energies of the red, green, and blue of each picture element on a screen are obtained, and then grayscale values upon compensation of the two colors with the lowest grayscale values of each picture element are obtained according to the channel emission energies of the red, green, and blue and the current self-luminous energies of the red, green, and blue of each picture element, so that the colors of the displayed content on the screen can be compensated according to the external light intensity, thereby preventing content color distortion and improving user experience.

An embodiment of the present invention further provides a user terminal 2, including a transmitter 24, a receiver 25, and a bus 26. As shown in FIG. 6, the user terminal 2 further includes:

a color channel sensor 21, configured to obtain channel readings of a red channel, a green channel, and a blue channel;

a processor 22, configured to obtain, according to the channel readings of the red channel, the green channel, and the blue channel and screen reflectivity, emission energies of the red channel, the green channel, and the blue channel;

where the processor 22 is further configured to obtain, according to screen luminance and a red grayscale value, a green grayscale value, and a blue grayscale value of each picture element on a screen, current self-luminous energies of the red, green, and blue of each picture element on the screen; and the processor 22 is further configured to obtain, according to the emission energies of the red channel, the green channel, and the blue channel and the current self-luminous energies of the red, green, and blue of each picture element, self-luminous energies upon compensation of the two colors with the lowest grayscale values among the red, green, and blue of each picture element; and a memory 23, configured to store a mapping of the screen luminance, the color grayscale value and the color self-luminous energy.

Further, when obtaining the emission energies of the red channel, the green channel, and the blue channel, the processor 22 may be specifically configured to:

obtain the emission energy of the red channel by multiplying the channel reading of the red channel and the screen reflectivity;

obtain the emission energy of the green channel by multiplying the channel reading of the green channel and the screen reflectivity; and obtain the emission energy of the blue channel by multiplying the channel reading of the blue channel and the screen reflectivity.

Further, when obtaining the self-luminous energies of the red, green, and blue of each picture element on the screen, the processor 22 may further be specifically configured to:

obtain the screen luminance and obtain the red grayscale value, the green grayscale value, and the blue grayscale value of each picture element on the screen;

obtain, according to the mapping of the screen luminance, the color grayscale value, and the color self-luminous energy, the self-luminous energy of red in correspondence with the red grayscale value;

obtain, according to the mapping of the screen luminance, the color grayscale value, and the color self-luminous energy, the self-luminous energy of green in correspondence with the green grayscale value; and obtain, according to the mapping of the screen luminance, the color grayscale value, and the color self-luminous energy, the self-luminous energy of blue in correspondence with the blue grayscale value, where the mapping of the screen luminance, the color grayscale value, and the color self-luminous energy is preset in the user terminal.

Further, when obtaining the self-luminous energies upon compensation of the two colors with the lowest grayscale values among the red, green, and blue of each picture element, the processor 22 may further be specifically configured to:

compare the red grayscale value, the green grayscale value, and the blue grayscale value of each picture element on the screen;

if the red grayscale value is the largest, obtain, according to a first self-luminous energy formula, the green self-luminous energy upon compensation and obtain, according to a second self-luminous energy formula, the blue self-luminous energy upon compensation, where the first self-luminous energy formula includes:

$$G'_s = G_s * \frac{R_s + R_r}{R_s} - G_r,$$

where $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula includes:

$$B'_s = B_s * \frac{R_s + R_r}{R_s} - B_r,$$

where $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel;

if the green grayscale value is the largest, obtain, according to a third self-luminous energy formula, the red self-luminous energy upon compensation and obtain, according to a fourth self-luminous energy formula, the blue self-luminous energy upon compensation, where the third self-luminous energy formula includes:

$$R'_s = R_s * \frac{G_s + G_r}{G_s} - R_r,$$

where $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula includes:

$$B'_s = B_s * \frac{G_s + G_r}{G_s} - B_r,$$

where $B_s'$ indicates the red self-luminous energy upon compensation when the green grayscale value is the largest, $B_s$ indicates the current blue self-luminous energy, indicates the current green self-luminous energy, $G_r$ indicates the channel reading of the green channel, and $B_r$ indicates the channel reading of the blue channel; and if the blue grayscale value is the largest, obtain, according to a fifth self-luminous energy formula, the red self-luminous energy upon compensation and obtain, according to a sixth self-luminous energy formula, the green self-luminous energy upon compensation, where the fifth self-luminous energy formula includes:

$$R'_s = R_s * \frac{B_s + B_r}{B_s} - R_r,$$

where $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula includes:

$$G'_s = G_s * \frac{B_s + B_r}{B_s} - G_r,$$

where $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

Further, when obtaining the grayscale values upon compensation of the two colors with the lowest grayscale values according to the self-luminous energies upon compensation of the two colors with the lowest grayscale values, the processor 22 may further be specifically configured to:

obtain, according to the green self-luminous energy upon compensation and by using a green grayscale formula, the green grayscale value upon compensation and obtain, according to the blue self-luminous energy upon compensation and by using a blue grayscale formula, the blue grayscale value upon compensation, if the red grayscale value is the largest;

obtain, according to the red self-luminous energy upon compensation and by using a red grayscale formula, the red grayscale value upon compensation and obtain, according to the blue self-luminous energy upon compensation and by using the blue grayscale formula, the blue grayscale value upon compensation, if the green grayscale value is the largest; and obtain, according to the red self-luminous energy upon compensation and by using the red grayscale formula, the red grayscale value upon compensation and obtain, according to the green self-luminous energy upon compensation and by using the green grayscale formula, the green grayscale value upon compensation, if the blue grayscale value is the largest, where the red grayscale formula includes:

$$R' = \sqrt[2.2]{\frac{R'_s * \left(\frac{R}{255}\right)^{2.2}}{R_s}} * 255,$$

where $R_s'$ indicates the red self-luminous energy upon compensation, $R_s$ indicates the red grayscale value, and R' indicates the red grayscale value upon compensation;

the green grayscale formula includes:

$$G' = \sqrt[2.2]{\frac{G'_s * \left(\frac{G}{255}\right)^{2.2}}{G_s}} * 255,$$

where $G_s'$ indicates the green self-luminous energy upon compensation, $G_s$ indicates the green grayscale value, and G' indicates the green grayscale value upon compensation; and the blue grayscale formula includes:

$$B' = \sqrt[2.2]{\frac{B'_s * \left(\frac{B}{255}\right)^{2.2}}{B_s}} * 255,$$

where $B_s'$ indicates the blue self-luminous energy upon compensation, $B_s$ indicates the blue grayscale value, and B' indicates the blue grayscale value upon compensation.

After obtaining the grayscale values of the red, green, and blue upon compensation, the user terminal transmits the grayscale values upon compensation to a screen display controller so that the screen controller displays the corresponding colors according to the grayscale values upon compensation.

An embodiment of the present invention provides a user terminal, where channel emission energies of the red, green, and blue and screen reflectivity are obtained, and current self-luminous energies of the red, green, and blue of each picture element on a screen are obtained, and then grayscale values upon compensation of the two colors with the lowest grayscale values of each picture element are obtained according to the channel emission energies of the red, green, and blue and the current self-luminous energies of the red, green, and blue of each picture element, so that the colors of the displayed content on the screen can be compensated according to the external light intensity, thereby preventing content color distortion and improving user experience.

In the embodiments provided by the present application, it should be understood that the disclosed terminal and method may be implemented in other manners. For example, the described terminal embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional module.

The integrated unit implemented in the form of software functional unit may be stored in a computer readable storage medium. The software functional unit is stored in a storage medium, and contains several instructions used to instruct computer equipment (for example, a personal computer, a server, or network equipment) to perform the steps of the methods according to the embodiments of the present invention. The storage medium includes: any medium that is capable of storing program codes, such as a USB flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for calibrating screen colors, the method comprising:
using a red green blue sensor to obtain separate channel readings of a red channel, a green channel and a blue channel;
receiving, by a processor, the channel reading of the red channel, the green channel, and the blue channel, the processor being coupled to the sensor;
obtaining, by the processor, emission energies of the red channel, the green channel and the blue channel according to the channel readings of the red channel, the green channel, and the blue channel received by the processor and screen reflectivity;
obtaining, by the processor, current self-luminous energies of the red, green, and blue of each picture element on the screen according to screen luminance and a red grayscale value, a green grayscale value, and a blue grayscale value of each picture element on a screen;
comparing the red grayscale value, the green grayscale value, and the blue grayscale value of each picture element on the screen, and determining two colors with the lowest grayscale values from among the red grayscale value, the blue grayscale value, and the green grayscale value of each picture element on the screen;
obtaining self-luminous energies upon compensation of only the two colors with the lowest grayscale values among the red, green, and blue of each picture element according to the emission energies of the red channel, the green channel, and the blue channel and the current self-luminous energies of the red, green, and blue of each picture element;
obtaining grayscale values upon compensation of only the two colors with the lowest grayscale values according to the self-luminous energies upon compensation of only the two colors with the lowest grayscale values;
transmitting the grayscale values upon compensation of only the two colors with the lowest grayscale values to a screen controller, the screen controller being coupled to the processor and a display screen; and
compensating colors on the display screen, by the screen controller, according to the grayscale values received by the screen controller.

2. The method according to claim 1, wherein obtaining the emission energies of the red channel, the green channel, and the blue channel comprises:
receiving, by the processor, the channel reading of the red channel, the channel reading of the green channel, and the channel reading of the blue channel;
obtaining the screen reflectivity;
obtaining the emission energy of the red channel by multiplying the channel reading of the red channel and the screen reflectivity;
obtaining the emission energy of the green channel by multiplying the channel reading of the green channel and the screen reflectivity; and
obtaining the emission energy of the blue channel by multiplying the channel reading of the blue channel and the screen reflectivity.

3. The method according to claim 1, wherein obtaining the current self-luminous energies of the red, green, and blue of each picture element on the screen comprises:
obtaining the screen luminance;
obtaining the red grayscale value, the green grayscale value, and the blue grayscale value of each picture element on the screen;
obtaining the current self-luminous energy of red in correspondence with the red grayscale value according to a mapping of the screen luminance, the color grayscale value, and the color self-luminous energy;
obtaining the current self-luminous energy of green in correspondence with the green grayscale value according to the mapping of the screen luminance, the color grayscale value, and the color self-luminous energy; and obtaining the current self-luminous energy of blue in correspondence with the blue grayscale value according to the mapping of the screen luminance, the color grayscale value, and the color self-luminous energy.

4. The method according to claim 3, wherein the mapping of the screen luminance, the color grayscale value, and the color self-luminous energy are preset in a user terminal.

5. The method according to claim 1, wherein obtaining self-luminous energies upon compensation of only the two colors with the lowest grayscale values comprises:
   determining that the red grayscale value is the largest;
   obtaining, according to a first self-luminous energy formula, the green self-luminous energy upon compensation;
   obtaining, according to a second self-luminous energy formula, the blue self-luminous energy upon compensation;
   wherein the first self-luminous energy formula comprises:

$$G'_s = G_s * \frac{R_s + R_r}{R_s} - G_r$$

wherein $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and wherein the second self-luminous energy formula comprises:

$$B'_s = B_s * \frac{R_s + R_r}{R_s} - B_r$$

wherein $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

6. The method according to claim 1, wherein obtaining self-luminous energies upon compensation of only the two colors with the lowest grayscale values comprises:
   determining that the green grayscale value is the largest;
   obtaining, according to a third self-luminous energy formula, the red self-luminous energy upon compensation; and
   obtaining, according to a fourth self-luminous energy formula, the blue self-luminous energy upon compensation;
   wherein the third self-luminous energy formula comprises:

$$R'_s = R_s * \frac{G_s + G_r}{G_s} - R_r$$

wherein $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and wherein the fourth self-luminous energy formula comprises:

$$B'_s = B_s * \frac{G_s + G_r}{G_s} - B_r$$

wherein $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

7. The method according to claim 1, wherein obtaining self-luminous energies upon compensation of only the two colors with the lowest grayscale values comprises:
   determining that the blue grayscale value is the largest;
   obtaining, according to a fifth self-luminous energy formula, the red self-luminous energy upon compensation; and
   obtaining, according to a sixth self-luminous energy formula, the green self-luminous energy upon compensation;
   wherein the fifth self-luminous energy formula comprises:

$$R'_s = R_s * \frac{B_s + B_r}{B_s} - R_r$$

wherein $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and wherein the sixth self-luminous energy formula comprises:

$$G'_s = G_s * \frac{B_s + B_r}{B_s} - G_r$$

wherein $G_s'$ indicates the green self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

8. A user terminal, comprising:
   a red green blue sensor;
   a processor coupled to the red green blue sensor;
   a computer-readable storage medium coupled to the processor and storing a program to be executed by the processor, the program including instructions for:

receiving, from the red green blue sensor, separate channel readings of a red channel, a green channel, and a blue channel;

obtaining, according to the channel readings of a red channel, a green channel, and a blue channel and screen reflectivity, emission energies of the red channel, the green channel, and the blue channel;

obtaining, according to screen luminance and a red grayscale value, a green grayscale value, and a blue grayscale value of each picture element on a screen, current self-luminous energies of the red, green, and blue of each picture element on the screen;

comparing the red grayscale value, the green grayscale value, and the blue grayscale value of each picture element on the screen, and determining two colors with the lowest grayscale values from among the red grayscale value, the blue grayscale value, and the green grayscale value of each picture element on the screen;

obtaining, according to the emission energies of the red channel, the green channel, and the blue channel and the current self-luminous energies of the red, green, and blue of each picture element, self-luminous energies upon compensation of only the two colors with the lowest grayscale values among the red, green, and blue of each picture element; and obtaining, according to the self-luminous energies upon compensation of only the two colors with the lowest grayscale values, grayscale values upon compensation of only the two colors with the lowest grayscale values; and a screen controller coupled to the processor and a display screen, the screen controller being configured to:
receive the grayscale values upon compensation of only the two colors with the lowest grayscale values, and
compensating colors on the display screen according to the grayscale values received by the screen controller.

9. The user terminal according to claim 8, wherein the program further includes instructions for:
receiving the channel reading of the red channel, the channel reading of the green channel, and the channel reading of the blue channel;
obtaining the emission energy of the red channel by multiplying the channel reading of the red channel and the screen reflectivity;
obtaining the emission energy of the green channel by multiplying the channel reading of the green channel and the screen reflectivity; and
obtaining the emission energy of the blue channel by multiplying the channel reading of the blue channel and the screen reflectivity.

10. The user terminal according to claim 8, wherein the program further includes programs for:
obtaining the screen luminance, and obtaining the red grayscale value, the green grayscale value, and the blue grayscale value of each picture element on the screen;
obtaining, according to a mapping of the screen luminance, the color grayscale value, and the color self-luminous energy, the current self-luminous energy of red in correspondence with the red grayscale value;
obtaining, according to the mapping of the screen luminance, the color grayscale value, and the color self-luminous energy, the current self-luminous energy of green in correspondence with the green grayscale value; and obtaining, according to the mapping of the screen luminance, the color grayscale value, and the color self-luminous energy, the current self-luminous energy of blue in correspondence with the blue grayscale value, wherein
the mapping of the screen luminance, the color grayscale value, and the color self-luminous energy is preset in the user terminal.

11. The user terminal according to claim 8, wherein the program further includes instructions for:
if the red grayscale value is the largest, obtaining, according to a first self-luminous energy formula, the green self-luminous energy upon compensation and obtaining, according to a second self-luminous energy formula, the blue self-luminous energy upon compensation, wherein
the first self-luminous energy formula comprises:

$$G'_s = G_s * \frac{R_s + R_r}{R_s} - G_r,$$

wherein $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and the second self-luminous energy formula comprises:

$$B'_s = B_s * \frac{R_s + R_r}{R_s} - B_r,$$

wherein $B_s'$ indicates the blue self-luminous energy upon compensation when the red grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel;

if the green grayscale value is the largest, obtaining, according to a third self-luminous energy formula, the red self-luminous energy upon compensation and obtaining, according to a fourth self-luminous energy formula, the blue self-luminous energy upon compensation, wherein
the third self-luminous energy formula comprises:

$$R'_s = R_s * \frac{G_s + G_r}{G_s} - R_r,$$

wherein $R_s'$ indicates the red self-luminous energy upon compensation when the green grayscale value is the largest, $R_s$ indicates the current red self-luminous energy, $G_s$ indicates the current green self-luminous energy, $G_r$ indicates the channel reading of the green channel, and $R_r$ indicates the channel reading of the blue channel; and the fourth self-luminous energy formula comprises:

$$B'_s = B_s * \frac{G_s + G_r}{G_s} - B_r,$$

wherein $B_s'$ indicates the red self-luminous energy upon compensation when the green grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel; and if the blue grayscale value is the largest, obtaining, according to a fifth self-luminous energy formula, the red self-luminous energy upon compensation and obtaining, according to a sixth self-luminous energy formula, the green self-luminous energy upon compensation, wherein the fifth self-luminous energy formula comprises:

$$R_s' = R_s * \frac{B_s + B_r}{B_s} - R_r,$$

wherein $R_s'$ indicates the red self-luminous energy upon compensation when the green grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel; and the sixth self-luminous energy formula comprises:

$$G_s' = G_s * \frac{B_s + B_r}{B_s} - G_r,$$

wherein $R_s'$ indicates the red self-luminous energy upon compensation when the blue grayscale value is the largest, $B_s$ indicates the current blue self-luminous energy, $G_s$ indicates the current green self-luminous energy, $G_r$ indicates the channel reading of the green channel, and $B_r$ indicates the channel reading of the blue channel.

12. A method for calibrating screen colors, the method comprising:
using a red-green-blue sensor to obtain channel readings of a red channel, a green channel and a blue channel;
obtaining, by a processor, emission energies of the red channel, the green channel and the blue channel according to the channel readings of the red channel, the green channel, and the blue channel and screen reflectivity;
obtaining current self-luminous energies of the red, green, and blue of each picture element on the screen according to screen luminance and a red grayscale value, a green grayscale value, and a blue grayscale value of each picture element on a screen;
obtaining self-luminous energies upon compensation of the two colors with the lowest grayscale values among the red, green, and blue of each picture element according to the emission energies of the red channel, the green channel, and the blue channel and the current self-luminous energies of the red, green, and blue of each picture element;
obtaining grayscale values upon compensation of the two colors with the lowest grayscale values according to the self-luminous energies upon compensation of the two colors with the lowest grayscale values;
transmitting the grayscale values upon compensation of the two colors with the lowest grayscale values to a screen controller, the screen controller being coupled to the processor and a display screen; and
compensating colors on the display screen, by the screen controller, according to the grayscale values received by the screen controller;
wherein obtaining self-luminous energies upon compensation of the two colors with the lowest grayscale values comprises:
comparing the red grayscale value, the green grayscale value, and the blue grayscale value of each picture element on the screen;
determining that the red grayscale value is the largest;
obtaining, according to a first self-luminous energy formula, the green self-luminous energy upon compensation;
obtaining, according to a second self-luminous energy formula, the blue self-luminous energy upon compensation;
wherein the first self-luminous energy formula comprises:

$$G_s' = G_s * \frac{R_s + R_r}{R_s} - G_r$$

wherein $G_s'$ indicates the green self-luminous energy upon compensation when the red grayscale value is the largest, $G_s$ indicates the current green self-luminous energy, $R_s$ indicates the current red self-luminous energy, $R_r$ indicates the channel reading of the red channel, and $G_r$ indicates the channel reading of the green channel; and wherein the second self-luminous energy formula comprises:

$$B_s' = B_s * \frac{R_s + R_r}{R_s} - B_r$$

wherein $B_s'$ indicates the blue self-luminous energy upon compensation when the red grayscale value is the largest, $B_s$ indicates the current blue self-luminous energy, $R_s$ indicates the current red self-luminous energy, $R_r$ indicates the channel reading of the red channel, and $B_r$ indicates the channel reading of the blue channel.

13. The method according to claim 12, wherein obtaining the emission energies of the red channel, the green channel, and the blue channel comprises:
obtaining the channel reading of the red channel, the channel reading of the green channel, and the channel reading of the blue channel;
obtaining the screen reflectivity;
obtaining the emission energy of the red channel by multiplying the channel reading of the red channel and the screen reflectivity;
obtaining the emission energy of the green channel by multiplying the channel reading of the green channel and the screen reflectivity; and
obtaining the emission energy of the blue channel by multiplying the channel reading of the blue channel and the screen reflectivity.

14. The method according to claim 12, wherein obtaining the current self-luminous energies of the red, green, and blue of each picture element on the screen comprises:

obtaining the screen luminance;

obtaining the red grayscale value, the green grayscale value, and the blue grayscale value of each picture element on the screen;

obtaining the current self-luminous energy of red in correspondence with the red grayscale value according to a mapping of the screen luminance, the color grayscale value, and the color self-luminous energy;

obtaining the current self-luminous energy of green in correspondence with the green grayscale value according to the mapping of the screen luminance, the color grayscale value, and the color self-luminous energy; and obtaining the current self-luminous energy of blue in correspondence with the blue grayscale value according to the mapping of the screen luminance, the color grayscale value, and the color self-luminous energy.

15. The method according to claim 14, wherein the mapping of the screen luminance, the color grayscale value, and the color self-luminous energy is preset in a user terminal.

* * * * *